United States Patent
Cowin et al.

(10) Patent No.: US 12,141,635 B2
(45) Date of Patent: Nov. 12, 2024

(54) SMARTCARD INLAY AND METHOD OF MANUFACTURING A SMARTCARD INLAY

(71) Applicant: TOUCH BIOMETRIX LIMITED, St Asaph (GB)

(72) Inventors: Michael Cowin, St Asaph (GB); Henricus Derckx, St Asaph (GB); Wilhelmus Van Lier, St Asaph (GB); Toru Sakai, St Asaph (GB)

(73) Assignee: TOUCH BIOMETRIX LIMITED, St Asaph (GB)

( * ) Notice: Subject to any disclaimer, the term of this patent is extended or adjusted under 35 U.S.C. 154(b) by 0 days.

(21) Appl. No.: 18/025,455

(22) PCT Filed: Sep. 10, 2021

(86) PCT No.: PCT/GB2021/052352
§ 371 (c)(1),
(2) Date: Mar. 9, 2023

(87) PCT Pub. No.: WO2022/053822
PCT Pub. Date: Mar. 17, 2022

(65) Prior Publication Data
US 2023/0325623 A1    Oct. 12, 2023

(30) Foreign Application Priority Data

Sep. 10, 2020  (GB) ................................ 2014277
Jun. 30, 2021  (GB) ................................ 2109465

(51) Int. Cl.
*G06K 19/07*    (2006.01)
*G06K 19/073*   (2006.01)
*G06K 19/077*   (2006.01)

(52) U.S. Cl.
CPC ... *G06K 19/0718* (2013.01); *G06K 19/07354* (2013.01); *G06K 19/07722* (2013.01)

(58) Field of Classification Search
CPC ......... G06K 19/0718; G06K 19/07354; G06K 19/07722
See application file for complete search history.

(56) References Cited

U.S. PATENT DOCUMENTS

| 6,360,953 B1 | 3/2002 | Lin et al. |
| 2009/0145972 A1* | 6/2009 | Evans .............. G06Q 20/40145 235/492 |

(Continued)

FOREIGN PATENT DOCUMENTS

| TW | 201629842 | 8/2016 |
| WO | 99/28701 | 6/1999 |
| WO | 2020/079838 | 4/2020 |

OTHER PUBLICATIONS

Examination Report for GB2014277.4 (Sep. 20, 2021).

(Continued)

*Primary Examiner* — Jamara A Franklin
(74) *Attorney, Agent, or Firm* — Barnes & Thornburg LLP (57) ABSTRACT

A method of manufacturing a smartcard inlay the method comprising: providing a dielectric sheet; depositing, on a first major surface of the dielectric sheet, an active matrix TFT array comprising at least one conductive layer; wherein the at least one conductive layer is deposited on regions of the dielectric sheet outside the active matrix TFT array to provide electrical connections of the inlay.

18 Claims, 4 Drawing Sheets

(56) References Cited

U.S. PATENT DOCUMENTS

2010/0117078 A1   5/2010  Kuwabara et al.
2017/0213097 A1   7/2017  Vogel et al.
2019/0087622 A1   3/2019  Benkley et al.

OTHER PUBLICATIONS

Examination Report for GB2109465.1 (Sep. 20, 2021).
Search Report & and Written Opinion for PCT/GB2021/052352 (Jan. 24, 2022).

* cited by examiner

SMARTCARD INLAY AND METHOD OF MANUFACTURING A SMARTCARD INLAY

This application is a US national stage application under Section 371 of PCT Application No. PCT/GB2021/052352, filed on Sep. 10, 2021, which claims priority from United Kingdom Patent Application Numbers 2014277.4, filed Sep. 10, 2020, and 2109465.1, filed Jun. 30, 2021, the entirety of each are hereby fully incorporated by reference herein.

FIELD OF INVENTION

The present invention relates to methods and apparatus, and more particularly to smartcards and components for smartcards such as biometric sensors, and to methods for manufacturing such smartcards and components for smartcards.

BACKGROUND

The use of personal identification numbers (PIN) has provided the traditional way to authenticate transactions made using payment cards. Access codes may also be used with cards which are used for access control systems. These and other types of authentication codes may be stolen or leaked to unauthorised users. This can represent a serious security threat.

In addition, the use of keypads to enter such codes may present an infection risk. Pathogens such as the covid-19 virus may be transmitted by contact with an infected surface. Users are increasingly reluctant to use such keypads.

Contactless systems have been proposed in which near field communications (NFC, RFID and the like) are used to read a smartcard to authenticate a user. This suffers from a major security flaw because the identity of the user cannot be verified. Any person who has the smartcard can use it in this way. In addition, so called "card skimming" is a growing worry.

A variety of technological solutions may be possible, and portable electronic devices such as smartphones offer one possibility. They often incorporate sophisticated computer processors, and are internet enabled. This can enable high value transactions to be performed with ease and can allow the users identity to be checked. Significant effort has been directed to providing secure user identification with a smartphone. Such technology however suffers from the problem of limited battery life and a low degree of user acceptance and uptake. Smartphones are designed to be phones, cameras, and media content delivery devices.

SUMMARY

Aspects and examples of the present disclosure aim to address technical problems related to those discussed above. In particular they may aim to provide a fingerprint sensor for incorporation into a smartcard and which may be simple to integrate into the card and reliable in use.

In an aspect there is provided a method of manufacturing a smartcard inlay the method comprising:
providing a dielectric sheet;
depositing, on a first major surface of the dielectric sheet,
an active matrix TFT array comprising at least one conductive layer;
wherein the at least one conductive layer is deposited on regions of the dielectric sheet outside the active matrix TFT array to provide electrical connections of the inlay.
The conductive layer may comprise a metallization layer.

The method may comprise providing, on the inlay, further components of the inlay connected by said electrical connections.

The further components may comprise at least one of: passive electrical components, a read-out circuit for obtaining read out signals from the array, a secure element, power management circuitry, and a near field RF communications coil.

The electrical connections of the inlay may comprise a secure element contact electrode formed from said at least one conductive layer.

The array may be arranged to provide a capacitive touch sensing area on a second major surface of the substrate, opposite to the first major surface. The second major surface may comprise a material which can be printed upon to provide printable markings of the smartcard. The method may comprise providing, in a repeating pattern, a plurality of said arrays on the first major surface of the same laminar substrate. The method may comprise providing, on the second major surface, markings spatially arranged to correspond to the repeating pattern of the arrays.

The array may comprise a plurality of pixels and the method may comprise:
providing, in a first one of the at least one conductive layers of the array, a plurality of capacitive sensing electrodes, each sensing electrode corresponding to a respective one of the plurality of pixels.

The first conductive layer may be deposited as a continuous layer and patterned to provide the plurality of capacitive sensing electrodes. The method may comprise providing the pixels of the TFT array on the first conductive layer, wherein each of the pixels comprise a plurality of layers and a said capacitive sensing electrode interposed between the dielectric sheet and said plurality of layers.

The method may comprise patterning at least one conductive layer which constitutes part of said pixels in regions of the substrate outside the area of the array to provide said electrical connections of the inlay.

Providing the pixels may comprise depositing at least one further conductive layer, in addition to the at least one conductive layer
the method may further comprise using the at least one conductive layer and the further conductive layer to connect electrical connections of the inlay to the array.

The further conductive layer may provide connection between said electrical connections of the inlay and at least one other component of the inlay.

An aspect of the disclosure provides a smartcard inlay comprising:
a dielectric sheet;
a thin film transistor, TFT, array comprising at least one conductive layer, the array being deposited on a first major surface of the dielectric sheet; and,
electrical connections for connecting circuitry components of the smartcard
wherein the at least one conductive layer is deposited on regions of the dielectric sheet outside the TFT array to provide said electrical connections.

The TFT array may be configured to provide biometric skin contact sensing on the second major surface of the dielectric sheet.

The circuitry components of the smartcard may be disposed on the first major surface of the dielectric sheet and connected by said electrical connections.

The circuitry components may comprise at least one of:
passive electrical components,
a read-out circuit for obtaining read out signals from the array,
MCU
a secure element,
power management circuitry, and
a near field RF communications coil.

The electrical connections of the inlay may comprise a secure element contact electrode formed from said at least one conductive layer.

The dielectric sheet may comprise a window beneath the secure element contact electrode cut out to expose said contact electrode at the second major surface of the inlay. The secure element contact electrode may be provided on a portion of the substrate which is arranged to be folded over to expose said contact electrode at the second major surface of the inlay.

The second major surface may comprise a printable surface.

The apparatus may comprise:
a laminar dielectric sheet;
a plurality of thin film transistor, TFT, arrays each disposed on a respective corresponding one of a plurality of portions of a first major surface of the laminar dielectric sheet;
wherein each of said arrays comprises at least one conductive layer deposited on the laminar dielectric sheet;
each of said portions carries electrical connections for connecting circuitry components of the smartcard, and the at least one conductive layer is deposited on said portions of the substrate outside the TFT array to provide said electrical connections.

The arrays and the electrical connections may be disposed in a repeating pattern on said sheet to enable the sheet to be separated into a plurality of smartcard inlays.

The second major surface of the sheet may comprise a printable surface or carry a repeating pattern of markings corresponding to the repeating pattern in which the arrays and electrical connections are disposed.

In an aspect there is provided a smartcard inlay comprising: a dielectric sheet; a thin film transistor, TFT, array comprising at least one conductive layer, the array being deposited on a first major surface of the dielectric sheet; and, electrical connections for connecting circuitry components of the smartcard wherein the at least one conductive layer is deposited on regions of the dielectric sheet outside the TFT array to provide said electrical connections.

The laminar dielectric substrates described herein may be provided by a dielectric sheet, such as a polyimide sheet. This may in some instances be referred to in the art as a 'foil'.

In an aspect there is provided a fingerprint sensor which comprises a laminar dielectric substrate comprising a first sensing zone, and a second sensing zone separate from the first sensing zone. The first sensing zone and the second sensing zone are arranged to provide touch sensitive surfaces for sensing fingerprints on opposite faces of the smartcard. The areas occupied by the touch sensitive surfaces may correspond to each other on opposite faces of the card. For example, they may overlie each other on opposite surfaces of the same region of the card.

The first sensing zone and the second sensing zone may be spaced apart from each other on the laminar dielectric substrate. The area of the laminar dielectric substrate which provides this spacing may comprise a bend, such as a fold. Each of the first sensing zone and the second sensing zone may comprise a matrix of pixels comprising a plurality of columns, and each column of the first sensing zone may be electrically connected to a respective corresponding column of the second sensing zone for providing readout signals. For example corresponding columns of the first sensing zone and the second sensing zone may be connected to corresponding channels of the same readout circuit.

A connection zone may be provided between the two sensing zones to enable the communication of sensing and/or control signals of at least one sensing zone. For example sensing signals, such as read-out signals may be communicated via the connection zone e.g. so that signals generated by sensing pixels in one sensing zone can be read out by a read out circuit connected to the other sensing zone. The connection zone may comprise conductive tracks connecting columns of pixels of the first sensing zone to columns of pixels of the second sensing zone. The conductive tracks may be provided by a metallization layer of the pixels, such as a metallization layer which also provides a source-drain layer of a TFT stack.

The substrate may be bent (e.g. bent over on itself). For example it may be folded. The metallization described above can provide electrical connections which span this bend or fold.

Sensing electronics may be carried on a first surface of each sensing zone and a second surface of the substrate, opposite the first surface, may provide the touch sensitive surfaces.

The sensing electronics may comprise a TFT array deposited on the substrate. The sensor may comprise a readout circuit for controlling at least one of the two sensing zones.

The readout circuit may comprise an integrated circuit (IC) carried by the substrate. The readout circuit may be provided in a single IC arranged to obtain readout signals from both of the two sensing zones. The fingerprint sensor may comprise a signal interface, for providing signals from the fingerprint sensor to the smartcard and/or receiving electrical power from the smartcard. The signal interface may be carried by a region of substrate joined to the sensing zones by the region which carries the readout circuit.

Embodiments of the disclosure provide a smartcard comprising any one the fingerprint sensors described or claimed herein, and a body having a recess configured to allow an integrated circuit (such as the IC which comprises the read out circuit) to be disposed therein, and signal connections disposed about the recess for connection to the integrated circuit. The body may comprise a slot through the body and connections to at least one of the sensing zones may pass through the slot.

Connections to at least one of the sensing zones may pass around the edge of the body. For example, the substrate may be folded around the edge of the body.

Embodiments of the disclosure provide a smartcard comprising any one the fingerprint sensors described or claimed herein and a body comprising a slot through the body, wherein electrical connections to at least one of the sensing zones pass through the slot.

Embodiments of the disclosure provide a smartcard system comprising:
a laminar body for a smartcard, the body having a readout circuit disposed therein, and first body connections for connecting an active matrix TFT array to the readout circuit;
a laminar substrate carrying an active matrix TFT array on a first major surface of the laminar substrate wherein the TFT array is arranged to provide a touch sensitive area on a second major surface of the substrate, opposite to the first surface, the laminar substrate carrying first substrate connections for connecting the active matrix TFT array to the first body connections.

The first body connections and the first substrate connection may be provided on opposing surfaces of the body and the substrate. For example these opposing surfaces may face each other when the body and the substrate are affixed to each other in the smartcard.

The body may comprise second body connections for connecting a second active matrix TFT array to the readout circuit, and the system may comprise a second laminar substrate carrying second substrate connections for connecting a second active matrix TFT array to the second body connections.

The first active TFT array may be covered by the first laminar substrate at the first face of the smartcard, and the second active TFT array may be covered by the second laminar substrate at the second face of the smartcard, opposite to the first face.

The first active TFT array and the second active TFT array may each provide touch sensitive areas for sensing a fingerprint and the touch sensitive areas may overlie each other on opposite faces of the smartcard.

An embodiment provides a smartcard comprising:
  an inner layer comprising a dielectric substrate having a touch sensitive TFT array deposited on a region of the substrate; and
  a first outer layer, covering a first surface of the inner layer, and having a window therethrough to the region of the inner layer, whereby the touch sensitive TFT array is recessed into the smartcard. The dielectric substrate may be sandwiched between the first outer layer and a second outer layer.

The touch sensitive TFT array may be disposed on a second surface of the substrate, opposite to the first surface, whereby the dielectric substrate provides a touch sensitive surface in the window. The touch sensitive TFT array may be provided on the first surface of the inner layer and covered by an encapsulation layer, wherein the encapsulation layer provides a touch sensitive surface in the window.

For the avoidance of doubt, the disclosure of this application is intended to be considered as a whole. Any feature of any one of the examples disclosed herein may be combined with any selected features of any of the other examples described herein.

For example, features of methods may be implemented in suitably configured hardware, and the functionality of the specific hardware described herein may be employed in methods which may implement that same functionality using other hardware.

BRIEF DESCRIPTION OF DRAWINGS

Embodiments of the disclosure will now be described in detail, by way of example only, with reference to the accompanying drawings, in which.

SPECIFIC DESCRIPTION

Figure 1:
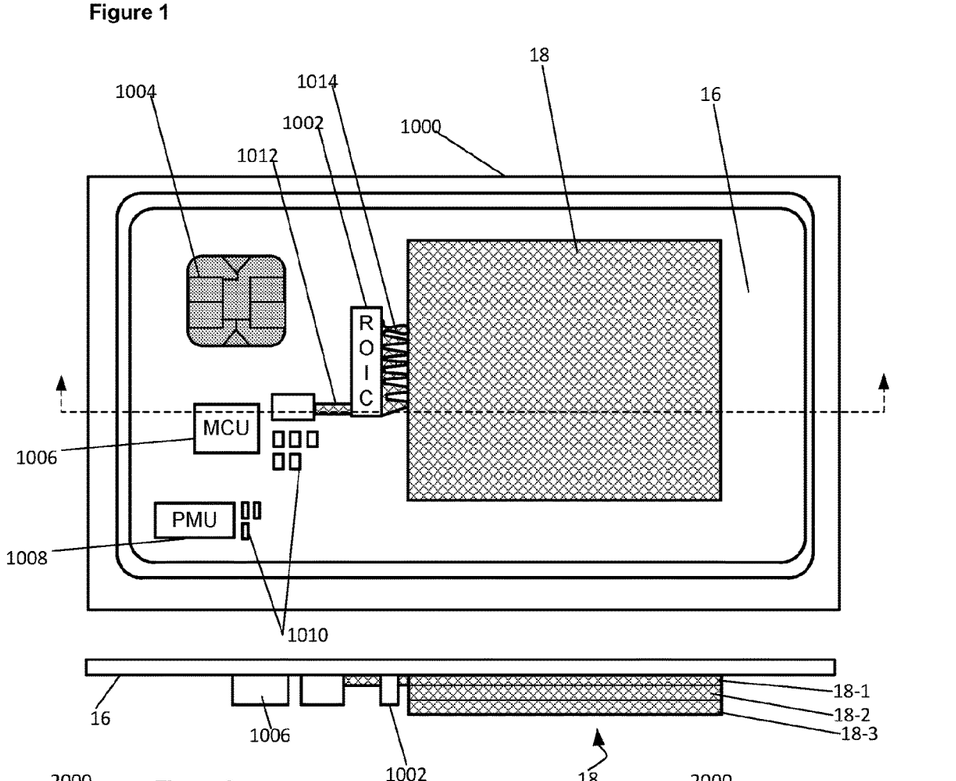
FIG. 1 shows a plan view and a section view of an inlay for incorporation into a smartcard.

FIG. 1 shows a smartcard inlay 1000 according to the present disclosure.

This smartcard inlay comprises a dielectric sheet 16, and a sensing array 18 for sensing a fingerprint. The smartcard inlay 1000 also carries electronic and/or electrical components for the smartcard, such as a read-out integrated circuit, ROIC, 1002 for obtaining sensor signals from the sensing array 18, a secure microcontroller unit, MCU, 1006 and a power management unit, PMU, 1008. It may also carry passive components such as resistors, capacitors and inductors 1010.

As also shown in FIG. 1, the inlay may comprise a set of contact electrodes 1004 for a secure element, such as those incorporated into smartcards for conducting financial transactions (e.g. debit and credit cards). Typically these contact electrodes comprise a plurality of separate conductive lands arranged in a generally rectangular area of the inlay. These contact pads may enable electrical contact to be provided between a card reader, such as an ATM or electronic point of sale (EPOS) terminal, and the secure element. The secure element may be provided separately from the inlay or integrated into the inlay.

The sensing array 18 comprises a plurality of pixels, arranged in a matrix made up of rows and columns. Each pixel typically comprises at least one thin film transistor, TFT, and at least one capacitive sensing electrode. The array of pixels is formed from a layered structure (e.g. a "stack"). The layers 18-1, 18-2, 18-3 of this stack are indicated very generally in FIG. 1. Although not visible in FIG. 1, in the finished stack, the layers generally are not each continuous, but each may be patterned (e.g. by etching in some way). As will be appreciated in the context of the present disclosure also each layer of material may not be provided in a single plane instead it may conform to the shape of the structure upon which it is deposited—e.g. falling into any recess and/or overlying any protrusion. The stack may comprise one or more conductive layers, and a layer comprising an active material—e.g. a semiconducting material such as indium gallium zinc oxide (IGZO) or another appropriate active material. The stack may also comprise one or more dielectric layers.

These different layers 18-1, 18-2, 18-3, conductive, active (semiconducting), and dielectric, are generally patterned, whether by virtue of the manner in which they are deposited or by etching in some way. The patterning of the layers 18-1, 18-2, 18-3 in the stack provides the components which make up the pixels of the array. These components generally comprise things such as a sensing electrode, a TFT, capacitors, electrical connections and so forth. It will be appreciated in the context of the present disclosure that this stack may be built up by applying (e.g. depositing) the layers in a sequence onto the dielectric sheet. Each layer may be patterned, for example by etching away material of that layer, before applying a subsequent layer to enable the components of the pixels to be formed from the stack.

Conductive material from at least one of the conductive layers 18-2 of the stack is also deposited on regions 1012, 1014, of the dielectric sheet outside the TFT array 18. This deposited conductive material is used to provide electrical connections on the inlay. These electrical connections may, for example, be used to connect 1014 components such as the ROIC to the array but may also be used to connect 1012 together other components. For example, these connections may be used to connect together two other components of the inlay, other than the array. These connections, 1012, provided by the conductive layer of the array but outside the array area, may connect at least two of the following:

i. passive electrical components,
  ii. a read-out circuit for obtaining read out signals from the array (such as the ROIC),
  iii. the MCU,
  iv. a secure element for the smart card,
  v. the PMU and/or other power management circuitry, and,
  vi. a near field RF communications antenna/coil.

The material of this same deposited conductive layer 18-2 may also be used to form the contact electrodes 1004 of the secure element.

As will be explained below, the sensing array 18 may be arranged to provide biometric touch sensing—for example with a sensing resolution high enough to perform biometric sensing of surface contours of a user's skin—for obtaining biometric skin contact data such as a fingerprint or palm print. The stack of layers 18-1, 18-2, 18-3 may be arranged so that the biometric sensing surface (the fingerprint sensor) is provided by the reverse side of the dielectric sheet 16. That is to say, the capacitive sensing electrode of each pixel is disposed close enough to the dielectric sheet 16 and the dielectric sheet 16 is thin enough that the fingerprint sensing surface can be provided by the surface of the dielectric sheet opposite to that which carries the array. In other words—the capacitive sensing electrode of each pixel may be provided at the bottom of the stack, without any other conductor between the electrode and the laminar sheet which forms the body of the inlay.

In these embodiments, if the contact electrodes 1004 for the secure element are to be provided on the same side of the dielectric sheet as the sensing array, then a window e.g. an aperture of some kind, may be provided through the dielectric sheet. The contact electrodes 1004 however may be exposed in a variety of different ways—for example, the dielectric sheet may be folded over to expose said contact electrode on the reverse side of the sheet—e.g. opposite the surface which carries the sensing array. The active matrix TFT array 18 generally comprises a plurality of sensing pixels having high enough sensitivity and resolution to provide biometric skin contact sensing—e.g. by sensing the ridges and valleys of the contours of the skin on the human hand, such as the fingerprint. Examples of sensors suitable for such an apparatus are described and claimed in the applicant's co-pending patent applications PCT/GB2020/050560, PCT/GB2020/051369, PCT/GB2020/051371, PCT/GB2020/051773, PCT/GB2020/051373, PCT/GB2020/051374 the entire contents of which are hereby incorporated by reference.

This reverse side of the sheet 16 (the second major surface of the inlay, e.g. the reverse face) may provide an external face of the assembled smart card. In some embodiments this reverse side comprises a printable surface and/or images and/or printed information. These and other embodiments of the disclosure may simplify manufacture of smart cards comprising biometric sensing capability.

Figure 2:
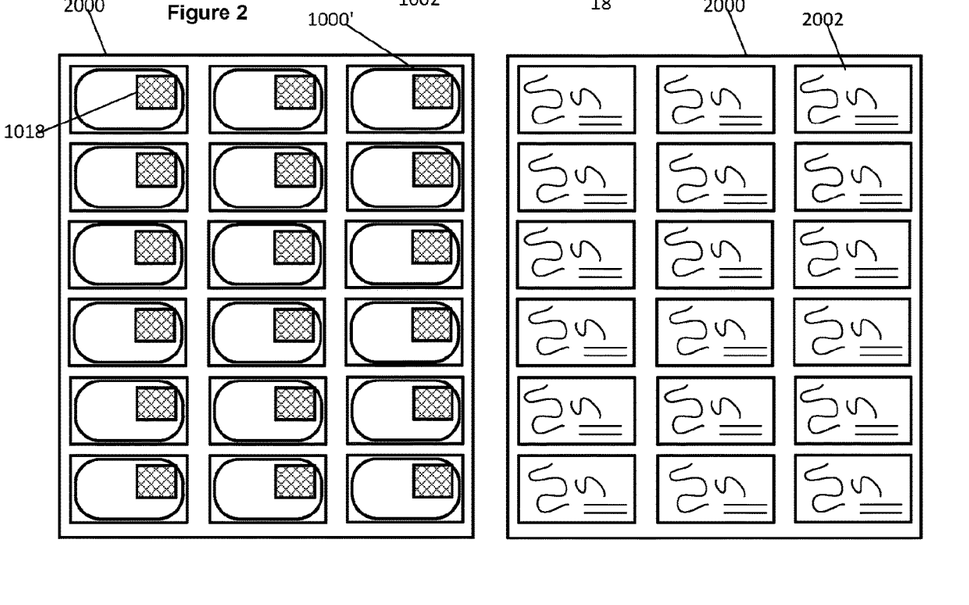
FIG. 2 shows a front and rear views of a laminar dielectric sheet comprising a repeating pattern of inlays such as those described with reference to FIG. 1.

FIG. 2 illustrates an apparatus formed in a process of manufacturing a smartcard according to the present disclosure.

As illustrated in FIG. 2 a plurality of thin film transistor, TFT, arrays 1018 can all be provided on one face of the same laminar dielectric sheet 2000. These TFT arrays 1018 may be regularly spaced apart in a grid pattern. The grid spacing may correspond to the dimensions of the smart card which is to be manufactured. It can be seen in FIG. 2 that each TFT array 1018 is disposed on a portion 1000' of the laminar dielectric sheet 1018, and the electrical connections and/or other electronic and electrical components of the smart card may also be disposed on that same portion 1000'.

The TFT arrays 1018 each have the same layer structure 18-1, 18-2, 18-3 as is described above with reference to FIG. 1, and in the process of manufacturing this layer structure, a deposition step includes providing a conductive layer 18-1 of the array. In that same deposition step, the same conductive layer may be deposited on areas of the laminar dielectric sheet outside the area of the array 1018. This conductive material can be patterned to provide electrical parts of the smart card, such as electrical connections between other components of the smart card (e.g. components other than the TFT array). This conductive material can also be used to provide electrical connections to the TFT array.

These TFT arrays and the electrical connections formed from conductive material of one or more layer(s) of the array are thus deposited on portions of the laminar dielectric sheet in a repeating pattern. Each portion 1000' of the laminar dielectric sheet corresponds to a unit cell of this repeating pattern. To manufacture a smart card, a unit cell portion can be separated from the larger sheet, e.g. by cutting. This portion cut from the larger sheet may be used to provide an inlay such as that described above with reference to FIG. 1, or any other such apparatus as described or claimed herein.

The larger sheet illustrated in FIG. 2 can thus be separated into a plurality of such smartcard inlays according to the present disclosure.

The second major surface 2000 of this larger sheet may comprise a printable surface, this printable surface may overlie the region occupied by the TFT arrays 1018. Markings such as images and/or text may thus be printed on regions of the smart card which also serve as a fingerprint sensor. These markings may be applied to the larger sheet prior to separation into the individual inlays. Rather than being printed, such markings may be integrated into the sheet itself. However it is done, the larger laminar dielectric sheet (e.g. having the repeating pattern of TFT arrays and electrical connections) may thus carry a repeating pattern of markings. The pattern of those markings may correspond to the same repeating pattern in which the arrays 1018 and electrical connections are disposed on the opposite face of the sheet.

Figure 3:
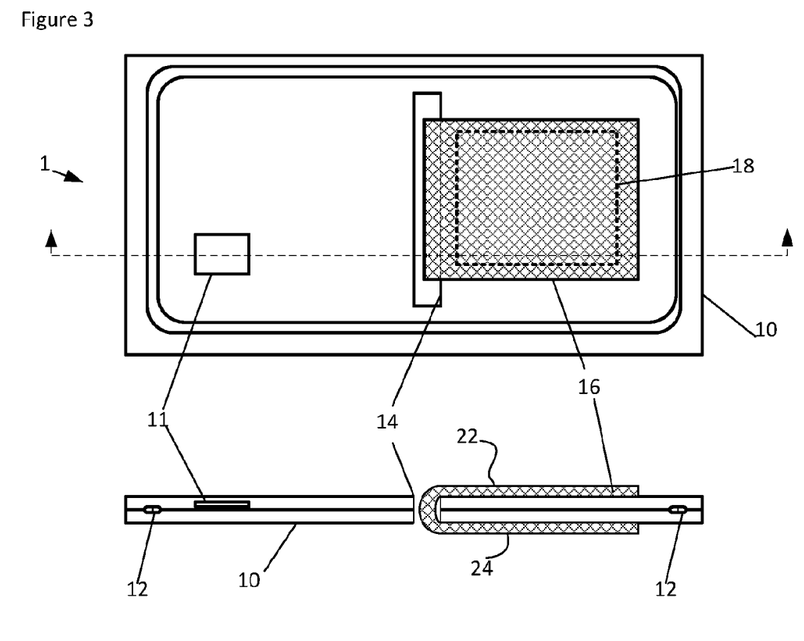
FIG. 3 shows a plan view and a section view of a smartcard assembly.

FIG. 3 illustrates a smartcard system 1 in which two biometric skin contact sensors are provided by touch sensitive surfaces 22, 24 positioned on opposite major surfaces of the same region of the smartcard.

This smartcard system 1 comprises a laminar body 10 carrying an antenna 12 and a secure element 11 for providing smartcard secure functions such as authenticating a transaction. A slot 14 is through the body 10. The slot 14 may be straight and elongate.

The smartcard system 1 also comprises a laminar substrate 16, such as a laminar dielectric sheet. The substrate 16 may be disposed through the slot 14, and bent (e.g. folded over onto the card adjacent the slot 14) so that one part of the substrate 16 lies adjacent a first major surface of the smartcard body 10, and the other part of the substrate 16 lies adjacent the opposite major surface of the smart card body. The laminar substrate 16 carries an active matrix TFT array which may be deposited on the substrate 16 (e.g. it may be provided by a smart card inlay such as one of those described above). This provides a touch sensitive surface 22 in a first sensing zone 18 of the substrate 16. Although it is not visible in the plan view of FIG. 3, the opposite side of the smartcard 10 may carry a further touch sensitive surface 24. This may be provided by a further area of active matrix TFT array which may be deposited on a different region of the same substrate 16 as described below.

The active matrix TFT array comprises a plurality of sensing pixels having high enough sensitivity and resolution to provide biometric skin contact sensing—e.g. by sensing the ridges and valleys of the contours of the skin on the human hand, such as the fingerprint. The arrangement depicted in FIG. 3 may be particularly useful because it can enable a double sided fingerprint sensor to be laminated into a smartcard in a single processing step. Examples of sensors suitable for such an apparatus are described and claimed in the applicant's co-pending patent applications PCT/GB2020/050560, PCT/GB2020/051369, PCT/GB2020/051371, PCT/GB2020/051773, PCT/GB2020/051373, PCT/GB2020/051374 the entire contents of which are hereby incorporated by reference.

Figure 4:
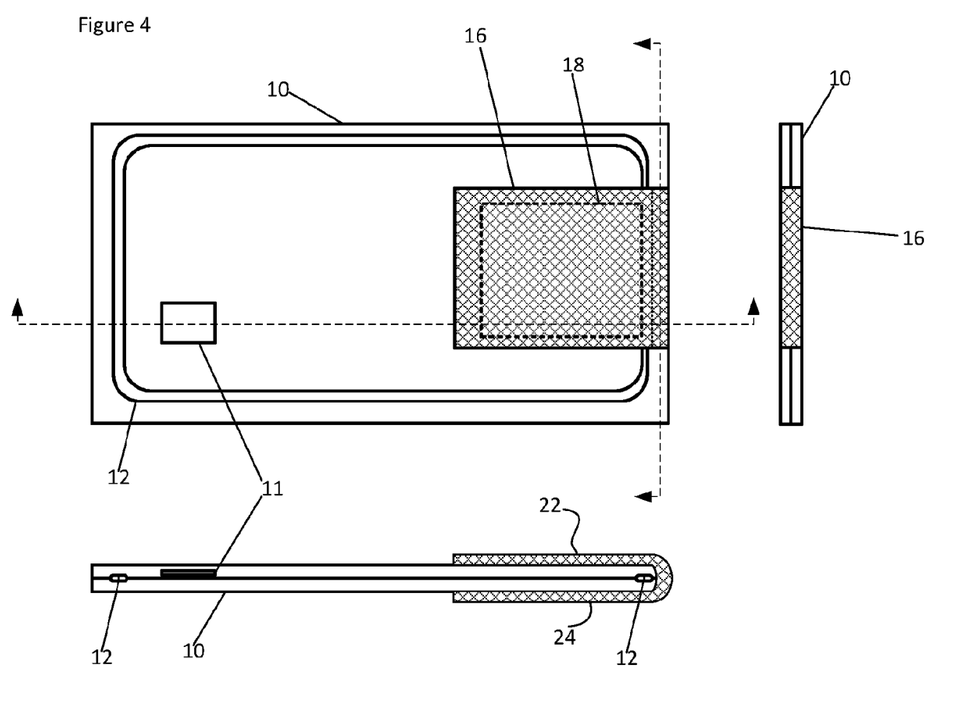
FIG. 4 shows a plan view and a section view of a second smartcard assembly.

The slot need not be provided in the body of the smart card, instead the laminar substrate 16 may be folded around the edge of the smartcard body 10 as depicted in FIG. 4. This may be done with the provision of a recess or channel in one edge of the smartcard body to allow the substrate to be folded around the edge of the smartcard. It will also be appreciated that the smartcard body may be thinned to allow the laminar substrate to be fitted flush into the body (for example a recess may be provided in one or both major surfaces of the smartcard body into which the laminar substrate can be assembled). This can enable the substrate to lie flush with the surface of the smartcard. As an alternative, an overlay may be provided which surrounds the laminar substrate so that the substrate and overlay together provide a flat major surface of the smartcard. In either case, further laminations may be provided over the sensor—e.g. to enable identifying information and/or images to be printed onto the major surfaces of the smartcard including in the areas occupied by the sensing zone 18.

Figure 5:
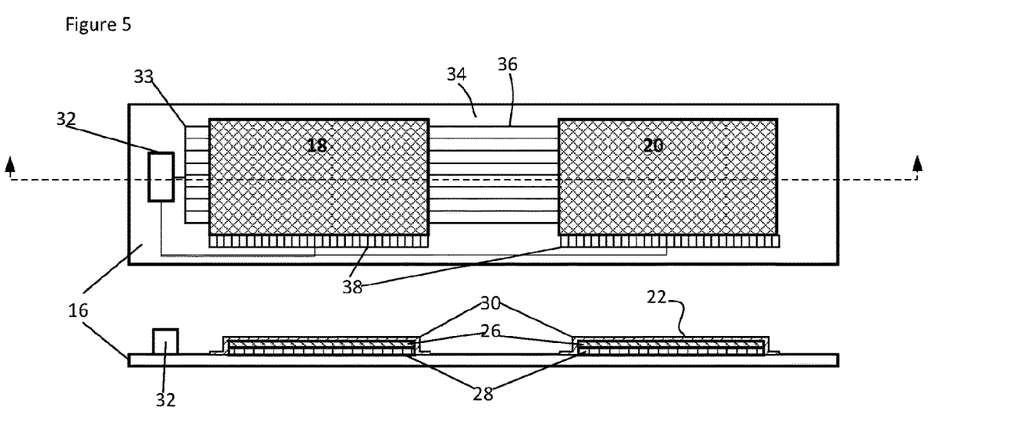
FIG. 5 shows a plan view and a section view of a laminar substrate carrying an active matrix TFT array for integration into a smartcard system.

FIG. 5 illustrates a possible implementation of fingerprint sensor for incorporation into a smartcard such as that illustrated in FIG. 3 and FIG. 4.

This sensor comprises a laminar dielectric substrate 16 and a controller 32 comprising readout circuitry and gate control and gate drive circuitry. At least part of the controller circuitry 32, such as the gate control circuitry, which may provide control signals for operating theee gate drives, may be provided an IC such as that described herein. In some embodiments the gate drive circuitry may be implemented in TFTs carried by the substrate 16.

Two active matrix TFT arrays are provided on this substrate 16. A first active matrix TFT array provides a first sensing zone 18, and a second active matrix TFT array provides a second sensing 20 zone separate from the first sensing zone 18. The two sensing zones 18, 20 are spaced apart from each other on a first surface of the substrate 16, by a connection zone 34 of the substrate 16.

The readout circuit of the controller 32 comprises a plurality of input channels for reading sensing signals from the two active matrix TFT arrays. The gate drive circuitry comprises a plurality of gate drive channels, each operable by the gate control circuitry to provide gate drive signals to at least one corresponding row of the TFT arrays in the sensing zones 18, 20. It will be appreciated in the context of the present disclosure that the controller 32 may comprise one or more of an analogue front end, an ADC, and a DAC arranged to provide such functionality. This may be provided at least in part by components in an integrated circuit. Some or all of such functionality may also be implemented in TFTs carried by the substrate 16.

Each of the two sensing zones 18, 20 comprises an electrode layer 26, a device layer 28, and a coating 30. The device layer may comprise a plurality of thinner layers (e.g. thin films). These may include both an active material such as IGZO (Indium Gallium Zinc Oxide), and one or more metallisation layers, insulating layers and vias. These may be arranged within the device layer to provide a variety of pixel circuits for sensing the proximity of the surface of the skin to the electrode layer of the array. Examples of suitable pixel circuits and their methods of operation are described and claimed in the applicant's co-pending patent applications PCT/GB2020/050560, PCT/GB2020/051369, PCT/GB2020/051371, PCT/GB2020/051773, PCT/GB2020/051373, PCT/GB2020/051374 the entire contents of which are hereby incorporated by reference. It will be appreciated in the context of the present disclosure that the electrode layer illustrated in FIG. 6, FIG. 7, and FIG. 8 typically comprises a plurality of such electrodes one for each pixel of the array. It will also be appreciated that the electrodes may be provided by metallisation similar to the metallisation which is used in the device layer of the TFT arrays.

There are two possible arrangements. In the first possibility, which is illustrated in FIG. 5 and FIG. 7 the electrode layer 26 is disposed on the first surface of the substrate 16, interposed between the substrate 16 and the device layer 28.

Figure 6:
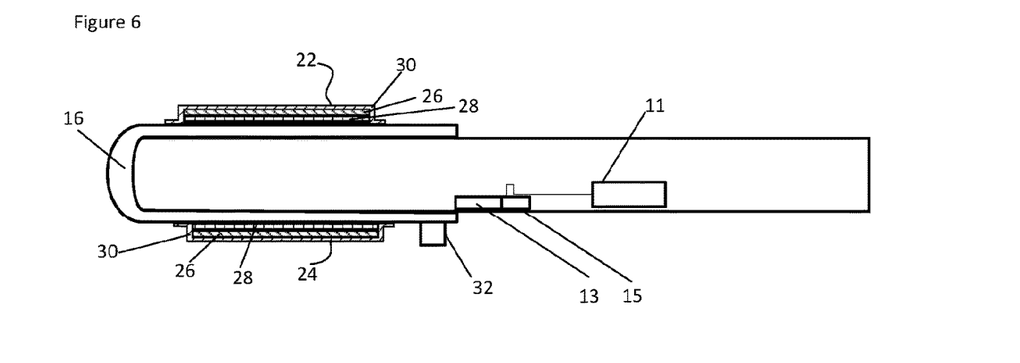
FIG. 6 illustrates a first possible arrangement in which the apparatus of FIG. 5 can be configured for integration into a smartcard system.

In the second possibility, which is illustrated in FIG. 6 the device layer 28 is deposited on the substrate 16 with the electrode layer 26 carried on the device layer 28 and the coating 30 provided over the top of the electrode layer 26.

Figure 7:
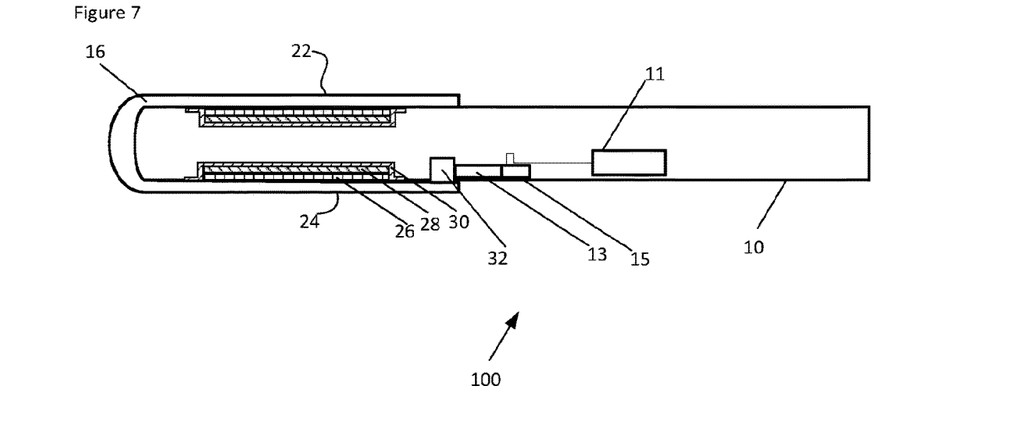
FIG. 7 illustrates a second possible arrangement in which the apparatus of FIG. 5 can be configured for integration into a smartcard system.

In the first possibility, which is illustrated in FIG. 5 and FIG. 7 the second surface of the laminar dielectric substrate 16 (opposite to the first surface to which the electrode layer 26 is affixed) provides the touch sensitive surface of the fingerprint sensor (e.g. the surface to be touched by a finger). Such an arrangement may be particularly advantageous because the laminar substrate may serve to encapsulate the sensor for example to protect it from damage and contamination.

In the second possibility, which is illustrated in FIG. 6, the coating 30 provides the touch sensitive surface 22 of the fingerprint sensor (e.g. the surface to be touched). This can enable very robust integration with the smart card because any thickness of laminar substrate can be chosen without detracting from sensitivity. It will be appreciated in the context of the present disclosure that the controller 32 is not to scale and although it is shown protruding from the surface of the substrate 16 it may be sufficiently small as to be recessed into the substrate 16 and/or not to protrude significantly from the surface and/or to be covered by further laminations of the smart card. In some embodiments the controller 32 may be provided on the surface of the substrate opposite to the surface on which the TFT arrays is carried. This may be done in a variety of ways, for example it may be provided on a second substrate, or "foil". In less preferred embodiments one or more vias may be provided through the dielectric substrate to connect the read out circuit and the gate drive circuit to the TFT arrays.

The TFT arrays 18, 20 comprise pixels arranged in rows and columns. Each row of pixels is connected to the gate drive circuitry of the controller 32 by gate drive connections 38. These connections 38 are arranged to enable the controller 32 to provide gate drive signals to activate individual rows or groups of rows of pixels in those arrays 18, 20. The columns of pixels of the first sensing area 18 are each connected to a corresponding input channel of the read out circuitry 32. Thus, by activating a particular row (or rows) the sensor signal from particular pixels can be identified on the different input channels of the read-out circuit.

Each column of pixels in the first sensing zone 18 may also be connected to a corresponding column of pixels in the second sensing zone 20 by conductive tracks 36 (see FIG. 5) which span the connection zone 34 of the substrate 16. It can thus be seen that a single set of input channels in the readout circuit can be used to obtain sensing signals from both of the two sensing zones 18, 20 and the location which is being sensed or scanned can be controlled by selecting the rows to which gate drive signals are applied—e.g. to a row (or rows) in the first sensing zone 18 or to a row (or rows) in the second sensing zone 20. In arrangements such as that illustrated in FIG. 3, and in FIG. 5, FIG. 6, and FIG. 7 as described below, this can enable a single read-out IC to provide double sided sensing functionality on a smartcard. In other words—this is one way in which a single sensor with a single controller can provide two sensing zones for sensing fingerprints on opposite faces of a smartcard.

The two touch sensitive surfaces of this fingerprint sensor can thus "overlie each other" on said opposite faces, that is to say be present on opposite faces of the same region of the smartcard. This may be of particular advantage when the card is grasped between the finger and thumb of the user, because identifying biometric features may be obtainable from both finger and thumb simultaneously without requiring any specific action on the part of the user other than to hold the smartcard as they would naturally.

Turning now to FIG. 6 and FIG. 7 there can be seen a smartcard system 100 comprising a smartcard body 10 carrying smartcard circuitry 11, such as a secure element for performing authentication functions of the smart card. The body also comprises electrical connections 15 connected to the smartcard circuitry 11 and disposed on the body 10 to enable connection to an interface 13 of a fingerprint sensor.

The system 100 also comprises a fingerprint sensor (such as those described and claimed herein). As described above this sensor comprises TFT arrays carried on a laminar dielectric substrate 16, which may be folded or otherwise arranged to provide touch sensitive surfaces 22, 24, on opposite major surfaces of the smartcard. The substrate 16 carries a controller 32, such as that described above, which may provide functionality such as read out of sensor signals from the arrays and the control of gate drive voltages to activate selected rows of the arrays. The substrate 16 may also carry a signal interface 13 connected to the controller 32 to enable connection to the smartcard circuitry via the electrical connections 15 mentioned above. These may provide electrical power to the fingerprint sensor and/or data communication such as control signals for operating the sensor and biometric signals obtained from the sensors.

The electrical connections 15 are disposed on the body 10 so that when the substrate 16 is assembled to the body 10, the controller 32 can be connected to the smartcard circuitry 11 via the interface 13. A variety of configurations may be used. For example, a recess may be provided in the smart card body 10, which is shaped to fit the controller 32 of the fingerprint sensor. The electrical connections 15 may be arranged adjacent this recess and positioned for connection to the signal interface 13 to the controller 32 when the controller is fitted into the recess.

To assemble such a smartcard, the smartcard circuitry 11 and the electrical connections 15 may be provided onto the smartcard body 10, and a recess may be provided in the body for receiving the controller 32. The laminar substrate 16 may then be positioned relative to the body so that the controller 32 fits into the recess and, with the controller 32 in the recess the signal interface 13 is positioned for connection to the electrical connections 15. This can enable the fingerprint sensor to be powered by the smartcard circuitry and to provide fingerprint signals to the smartcard circuitry. The laminar dielectric 16 smartcard circuitry 11 and smartcard body 10 may then be further assembled and finished. For example they may be covered with a printable substrate to enable images and other identifying information to be provided on the card. Identifying information may also be provided onto the card by embossing both the smartcard body and the laminar substrate together.

Figure 8:
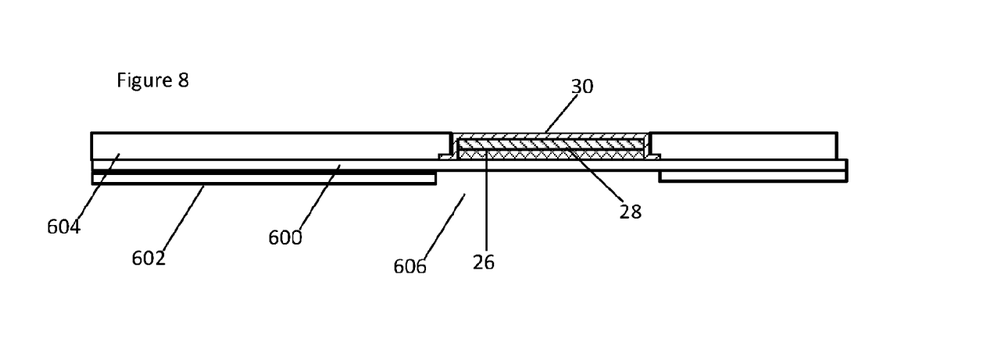
FIG. 8 illustrates a further arrangement in which an active matrix TFT array is integrated into a smartcard.

FIG. 8 shows a section through a further type of smart card. This smart card comprises an inner layer 600, a first outer layer 602, and a second outer layer 604.

The inner layer 600 is provided by a laminar dielectric substrate carrying a touch sensitive TFT array 26, 28, 30 similar to those described above with reference to FIG. 5 and FIG. 7. The TFT array 26, 28, 30 may be arranged on a major surface of the inner layer 600, and the first outer layer 602 may cover all or part of the opposite major surface of the inner layer 600. A window 604 may be provided through the first outer layer 602 to the (opposite surface of) the region of the inner layer 600 which carries the TFT array 26, 28, 30. As illustrated the dielectric substrate may be sandwiched between the first outer layer 602 and a second outer layer 604. The second outer layer may at least partially cover or encapsulate the on active surface of the TFT array 26, 28, 30, or the coating 30 of that array may be exposed as shown in the drawing. It can however be seen that, by this construction, the TFT array can be recessed into (and encapsulated/protected by) the body of the smartcard whilst the dielectric substrate upon which the sensor is carried (e.g. deposited upon) also serves to act as the surface to be touched to activate the sensor. The dielectric substrate thus provides a touch sensitive surface in the window.

As illustrated, the TFT array may be covered by an encapsulation layer 30. In some embodiments, as described above with reference to FIG. 6, an electrode layer 26 of the array may be provided adjacent the coating encapsulation layer 30 so that the encapsulation layer can provide a touch sensitive surface. This may be done in addition to the use of the substrate 600 to provide a touch sensitive surface in the window.

Any type of biometric sensor may be used in embodiments of the present application. Both passive matrix and active matrix capacitive touch sensors have been proposed. Active matrix capacitive touch sensors may include a switching element in each pixel. The switching element may control a conduction path between the capacitive sensing electrode in the pixel, and an input channel to an analogue to digital converter (ADC) in a read-out circuit. Typically each column of pixels in an active array is connected to one such input channel, but a multiplexing or signal combining arrangement may also be used to combine signals from multiple columns in a single input channel of the ADC. The charge stored in the array can thus be read from the active matrix by controlling the switching elements to connect each row (or group of rows) of pixels, one-by-one, to the ADC. Each pixel needs to be connected to the read-out circuit, and all of the pixels of each column are effectively connected in parallel.

The most common materials for a smartcard body (or blank) to the laminar substrate is to be assembled are poly-imide, PVC, PC, ABS and PET, but other materials may also be used. The laminar substrate carrying the fingerprint sensor may be provided separately from this body— for example it may be made and sold separately. It may then later be adhered, bonded, or otherwise integrated with it in the process of smart card manufacture. The laminar substrate described herein may be provided by any laminar dielectric, and may be flexible. One example is a poly-imide such as Kapton, which may be provided as a sheet, but other substrates may be used.

It will be appreciated from the discussion above that the embodiments shown in the Figures are merely exemplary, and include features which may be generalised, removed or replaced as described herein and as set out in the claims. With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

In some examples the functionality of the controller 32 may be provided by mixed analogue and digital processing and/or control functionality. It may comprise a general purpose processor, which may be configured to perform a method according to any one of those described herein. In some examples the controller may comprise digital logic, such as field programmable gate arrays, FPGA, application specific integrated circuits, ASIC, a digital signal processor, DSP, or by any other appropriate hardware. In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein. The controller may comprise an analogue control circuit which provides at least a part of this control functionality. An embodiment provides an analogue control circuit configured to perform any one or more of the methods described herein.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of manufacturing a smartcard inlay the method comprising:
   providing a dielectric sheet;
   depositing, on a first major surface of the dielectric sheet, an active matrix TFT array comprising at least one conductive layer;
   wherein the at least one conductive layer is deposited on regions of the dielectric sheet outside the active matrix TFT array to provide electrical connections of the inlay wherein the array is arranged to provide a capacitive touch sensing area on a second major surface of the substrate, opposite to the first major surface.

2. The method of claim 1 wherein the method comprises providing, on the inlay, further components of the inlay connected by said electrical connections.

3. The method of claim 2 wherein the further components comprise at least one of: passive electrical components, a read-out circuit for obtaining read out signals from the array, a secure element, power management circuitry, and a near field RF communications coil.

4. The method of claim 1 wherein the electrical connections of the inlay comprise a secure element contact electrode formed from said at least one conductive layer.

5. A method of manufacturing a smartcard inlay the method comprising:
   providing a dielectric sheet;
   depositing, on a first major surface of the dielectric sheet, an active matrix TFT array comprising at least one conductive layer;
   wherein the at least one conductive layer is deposited on regions of the dielectric sheet outside the active matrix TFT array to provide electrical connections of the inlay wherein the array comprises a plurality of pixels and the method comprises:
   providing, in a first one of the at least one conductive layers of the array, a plurality of capacitive sensing electrodes, each sensing electrode corresponding to a respective one of the plurality of pixels.

6. The method of claim 5 wherein the first conductive layer is deposited as a continuous layer and patterned to provide the plurality of capacitive sensing electrodes.

7. The method of claim 5 further comprising providing the pixels of the TFT array on the first conductive layer, wherein each of the pixels comprise a plurality of layers and a said capacitive sensing electrode interposed between the dielectric sheet and said plurality of layers.

8. The method of claim 5 further comprising patterning at least one conductive layer which constitutes part of said pixels in regions of the substrate outside the area of the array to provide said electrical connections of the inlay.

9. The method of claim 8 wherein providing the pixels comprises depositing at least one further conductive layer, in addition to the at least one conductive layer
   the method further comprising using the at least one conductive layer and the further conductive layer to connect electrical connections of the inlay to the array.

10. A smartcard inlay comprising:
    a dielectric sheet, with a first major surface and a second major surface on an opposite side thereof from the first major surface;
    a thin film transistor, TFT, array comprising at least one conductive layer, the array being deposited on the first major surface of the dielectric sheet; and, electrical connections for connecting circuitry components of the smartcard wherein the at least one conductive layer is deposited on regions of the dielectric sheet outside the TFT array to provide said electrical connections wherein the electrical connections of the inlay comprise a secure element contact electrode formed from said at least one conductive layer.

11. The inlay of claim 10 wherein the TFT array is configured to provide biometric skin contact sensing on the second major surface of the dielectric sheet.

12. The inlay of claim 10 wherein the circuitry components of the smartcard are disposed on the first major surface of the dielectric sheet and connected by said electrical connections.

13. The inlay of claim 10 wherein the dielectric sheet comprises a window beneath the secure element contact electrode cut out to expose said contact electrode at the second major surface of the inlay.

14. The inlay of claim 10 wherein the secure element contact electrode is provided on a portion of the substrate which is arranged to be folded over to expose said contact electrode at the second major surface of the inlay.

15. The inlay of claim 10 wherein the second major surface comprises a printable surface.

16. An apparatus comprising:
a laminar dielectric sheet;
a plurality of thin film transistor, TFT, arrays each disposed on a respective corresponding one of a plurality of portions of a first major surface of the laminar dielectric sheet;
wherein each of said arrays comprises at least one conductive layer deposited on the laminar dielectric sheet;
each of said portions carries electrical connections for connecting circuitry components of the smartcard, and the at least one conductive layer is deposited on said portions of the substrate outside the TFT array to provide said electrical connections.

17. The apparatus of claim 16 wherein the arrays and the electrical connections are disposed in a repeating pattern on said sheet to enable the sheet to be separated into a plurality of smartcard inlays.

18. The apparatus of claim 17 wherein the laminar dielectric sheet further comprises a second major surface upon an opposite side of the laminar dielectric sheet from the first major surface comprises a printable surface or carries a repeating pattern of markings corresponding to the repeating pattern in which the arrays and electrical connections are disposed.

* * * * *